US012812574B2

(12) United States Patent
Lauridsen et al.

(10) Patent No.: US 12,812,574 B2
(45) Date of Patent: Nov. 24, 2026

(54) TIMING ADJUSTMENT OF MEASUREMENTS IN A TERRESTRIAL NETWORK AND NON-TERRESTRIAL NETWORK SCENARIOS

(71) Applicant: Nokia Technologies Oy, Espoo (FI)

(72) Inventors: Mads Lauridsen, Aalborg (DK); István Zsolt Kovács, Aalborg (DK); Ayaz Ahmed, Bangalore (IN); Jedrzej Stanczak, Wroclaw (PL)

(73) Assignee: Nokia Technologies, Espoo (FI)

( * ) Notice: Subject to any disclaimer, the term of this patent is extended or adjusted under 35 U.S.C. 154(b) by 232 days.

(21) Appl. No.: 18/686,245

(22) PCT Filed: Jul. 13, 2022

(86) PCT No.: PCT/EP2022/069605
§ 371 (c)(1),
(2) Date: Feb. 23, 2024

(87) PCT Pub. No.: WO2023/025456
PCT Pub. Date: Mar. 2, 2023

(65) Prior Publication Data
US 2024/0397458 A1 Nov. 28, 2024

(30) Foreign Application Priority Data
Aug. 27, 2021 (IN) ............................ 202141038856

(51) Int. Cl.
*H04W 56/00* (2009.01)

(52) U.S. Cl.
CPC ..... *H04W 56/0015* (2013.01); *H04W 56/006* (2013.01)

(58) Field of Classification Search
CPC ......... H04W 56/0015; H04W 56/0025; H04W 56/006
See application file for complete search history.

(56) References Cited

U.S. PATENT DOCUMENTS 10,805,850 B1 10/2020 Benammar et al.
2016/0128020 A1* 5/2016 Agarwal ............... H04W 68/04 370/328

(Continued)

FOREIGN PATENT DOCUMENTS

WO 2020/161564 A1 8/2020
WO 2021/032305 A1 2/2021

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

(Continued)

*Primary Examiner* — Mansour Oveissi
*Assistant Examiner* — David M Oveissi
(74) *Attorney, Agent, or Firm* — Lippes Mathias LLP

(57) ABSTRACT

Various example embodiments relate to a solution for modifying mobility events by making them depend on information which captures a moving cell direction. A network node may obtain coverage information associated with a serving network and a target network. The network node may obtain synchronization signal timing data associated with the target network. The network node may determine time drift rate data for at least one user node based at least partly on location data and satellite ephemeris data. The network node may cause transmission of the time drift rate data associated with the time drift to the at least one user node to enable the user node to perform a measurement of a target cell of the target network using the time drift rate data. Nodes, methods, and computer programs are disclosed.

20 Claims, 9 Drawing Sheets

(56) References Cited

U.S. PATENT DOCUMENTS

| | | | | |
|---|---|---|---|---|
| 2019/0313272 | A1 | 10/2019 | Zhou et al. | |
| 2022/0360319 | A1* | 11/2022 | Shrestha | H04W 56/0015 |
| 2023/0179294 | A1* | 6/2023 | Kuang | H04B 7/18541 370/316 |
| 2023/0284060 | A1* | 9/2023 | Euler | H04W 24/10 370/329 |

FOREIGN PATENT DOCUMENTS

| | | | |
|---|---|---|---|
| WO | 2021/037645 | A1 | 3/2021 |
| WO | 2021/088043 | A1 | 5/2021 |
| WO | 2022/079344 | A1 | 4/2022 |

OTHER PUBLICATIONS

"3rd Generation Partnership Project; Technical Specification Group Radio Access Network; NR; Requirements for support of radio resource management (Release 17)", 3GPP TS 38.133, V17.1.0, Mar. 2021, 2172 pages.
"Solutions for NR to support non-terrestrial networks (NTN)", 3GPP TSG RAN meeting #90-e, RP-202908, Agenda: 9.8.6, Thales, Dec. 7-11, 2020, 10 pages.
"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-40.
"Service continuity between TN and NTN", 3GPP TSG-RAN WG2 Meeting #108, R2-1915192, Agenda: 6.6.4.3, Huawei, Nov. 18-22, 2019, 5 pages.
"On SMTC and measurements gaps for NTN", 3GPP TSG-RAN WG2 Meeting #113 Electronic, R2-2100530, Agenda: 8.10.3.3, Nokia, Jan. 25-Feb. 5, 2021, 5 pages.
"Mobility for NTN-TN scenarios", 3GPP TSG-RAN WG2 Meeting #114-e, R2-2105253, Agenda: 8.10.3.3, MediaTek Inc, May 19-27, 2021, 5 pages.
"SMTC and MG configuration for NTN", 3GPP TSG-RAN WG2 Meeting #114 electronic, R2-2106386, Agenda: 8.10.3.3, Convida Wireless, May 19-27, 2021, 8 pages.
"Msc-generator", Sourceforge, Retrieved on Jun. 19, 2024, Webpage available at :https://sourceforge.net/projects/msc-generator/.
"IEEE 802.11", Wikipedia, Retrieved on May 7, 2024, Webpage available at : https://en.wikipedia.org/wiki/IEEE_802.11.
International Search Report and Written Opinion received for corresponding Patent Cooperation Treaty Application No. PCT/EP2022/069605, dated Nov. 8, 2022, 13 pages.
"UE Time and frequency Synchronisation for NR-NTN", 3GPP TSG RAN WG1 Meeting #105-e, R1-2105952, Agenda: 8.4.2, MediaTek, May 10-27, 2021, 18 pages.
"Summary #3 of AI 8.15.2 Enhancements to time and frequency synchronization", 3GPP TSG RAN WG1 Meeting #104bis-e, R1-2103950, Agenda: 8.15.2, MediaTek, Apr. 12-20, 2021, 76 pages.
"Discussion on time and frequency synchronization enhancement for IoT in NTN", 3GPP TSG RAN WG1 Meeting #104bis-e, R1-2102344, Agenda: 8.15.2, Huawei, Apr. 12-20, 2021, 9 pages.

* cited by examiner

TIMING ADJUSTMENT OF MEASUREMENTS IN A TERRESTRIAL NETWORK AND NON-TERRESTRIAL NETWORK SCENARIOS

RELATED APPLICATION

This application was originally filed as PCT Application No. PCT/EP2022/069605, filed on Jul. 13, 2022, which claims priority from IN application No. 202141038856, filed on Aug. 27, 2021, each of which is incorporated herein by reference in its entirety.

TECHNICAL FIELD

Various example embodiments generally relate to the field of wireless data communications. In particular, some example embodiments relate to a timing adjustment of measurements in terrestrial and non-terrestrial networks.

BACKGROUND

Wireless data communication may be provided by terrestrial (TN) and non-terrestrial (NTN) networks. In a terrestrial network, a user node may be stationary or moving with respect to a fixed base station. On the other hand, in a non-terrestrial network, a satellite, for example, a geostationary earth orbit (GEO) or a low earth orbit (LEO) satellite providing data communication coverage is always moving with respect to the user node. For example, an NTN user node will be time-frequency synchronized to a serving cell. In case of a LEO scenario, this means that the user node's understanding of time will change (relative to an earth-fixed time, for example, UTC) because the LEO satellite moves with about 7.5 km/s relative to Earth (at an altitude of 600-1200 km). This may cause various challenges when the user node needs, for example, to measure a target cell in a terrestrial network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments may provide an efficient solution for enabling cell measurements in an environment involving both a terrestrial network and a non-terrestrial network. This benefit may be achieved by the features of the independent claims. Further implementation forms are provided in the dependent claims, the description, and the drawings.

According to a first aspect, a network node may comprise at least one processor and at least one memory including computer program code, the at least one memory and the computer code configured to, with the at least one processor, cause the network node at least to: obtain coverage information associated with a serving network and a target network; obtain synchronization signal timing data associated target network; with the determine time drift rate data for at least one user node based at least partly on location data and satellite ephemeris data; and cause transmission of the time drift rate data associated with the time drift to the at least one user node to enable the user node to perform a measurement of a target cell of the target network using the time drift rate data.

In an example embodiment, the location data comprises of the following: location data of the user node, location data associated with a group of user nodes, location data associated with a serving cell center of the serving network, location data associated with a target cell center of the target network, location data associated with a radio coverage of a serving cell of the serving network, location data associated with a radio coverage of the target cell of the target network, and historical location data associated with a handover of the user node between the serving network and the target network.

In an example embodiment, the time drift rate data comprises time reference data and offset data to perform the measurement of the target cell, the offset data comprising a specific offset value for each time reference value in the time reference data.

In an example embodiment, the time drift rate data further comprises validity time period data, the validity time period data comprising a specific validity time for each time offset value in the offset data.

In an example embodiment, the at least one memory including computer program code, the at least one memory and the computer code are configured to, with the at least one processor, cause the network node at least to: cause transmission of the time drift rate data associated with the time drift to the user node as a user node specific transmission.

In an example embodiment, the at least one memory including computer program code, the at least one memory and the computer code are configured to, with the at least one processor, cause the network node at least to: cause transmission of the time drift rate data associated with the time drift to the user node as a broadcast transmission.

In an example embodiment, the serving network comprises one of a terrestrial network and a non-terrestrial network, and the target network comprise the other one of the terrestrial network and the non-terrestrial network.

In an example embodiment, the time drift data further comprises an indication of a reference point based on which the time drift data has been determined.

In an example embodiment, the network node is configured to cause transmission of the time drift rate with an synchronization signal and PBCH block based radio resource management measurement timing configuration (SMTC) window and/or measurement gap indication.

According to a second aspect, a user node may comprise at least one processor and at least one memory including computer program code, the at least one memory and the computer code configured to, with the at least one processor, cause the user node at least to: obtain time drift rate data associated with a time drift from a serving network, the time drift data having been determined based at least partly on location data and satellite ephemeris data; and apply the time drift data to perform a measurement of a target cell of a target network.

In an example embodiment, the time drift rate data comprises time reference data and offset data to perform the measurement of the target cell, the offset data comprising a specific offset value for each time reference value in the time reference data.

In an example embodiment, the time drift rate data further comprises validity time period data, the validity time period data comprising a specific validity time for each time offset value in the offset data.

In an example embodiment, the time drift data further comprises an indication of a reference point based on which the time drift data has been determined.

In an example embodiment, the at least one memory and the computer code are further configured to, with the at least one processor, cause the user node to: cause transmission of an indication about a deviation experienced while trying to perform the measurement of the target cell.

In an example embodiment, the at least one memory and the computer code are further configured to, with the at least one processor, cause the user node to: cause transmission of the time drift rate data to at least one other user node.

In an example embodiment, the user node is configured to obtain the time drift rate with an synchronization signal and PBCH block based radio resource management measurement timing configuration (SMTC) window and/or measurement gap indication.

In an example embodiment, the location data comprises of the following: location data of the user node, location data associated with a group of user nodes, location data associated with a serving cell center of the serving network, location data associated with a target cell center of the target network, location data associated with a radio coverage of a serving cell of the serving network, location data associated with a radio coverage of the target cell of the target network, and historical location data associated with a handover of the user node between the serving network and the target network.

According to a third aspect, a network node may comprise at least one processor and at least one memory including computer program code, the at least one memory and the computer code configured to, with the at least one processor, cause the network node at least to: obtain coverage information associated with a serving network and a target network; obtain synchronization signal timing data associated with the target network; and cause transmission of a user node global navigation satellite system (GNSS) timing reference indication to the user node to enable the user node to perform a measurement of a target cell of the target network based on the user node GNSS timing reference indication.

In an example embodiment, the network node is configured to cause transmission of the user node GNSS timing reference indication with an synchronization signal and PBCH block based radio resource management measurement timing configuration (SMTC) window and/or measurement gap indication.

In an example embodiment, the at least one memory including computer program code, the at least one memory and the computer code are configured to, with the at least one processor, cause the network node at least to: avoid communication with the user node in partially aligned subframes.

In an example embodiment, the serving network comprises one of a terrestrial network and a non-terrestrial network, and the target network comprise the other one of the terrestrial network and the non-terrestrial network.

According to a fourth aspect, a user node may comprise at least one processor and at least one memory including computer program code, the at least one memory and the computer code configured to, with the at least one processor, cause the user node at least to: obtain a user node global navigation satellite system (GNSS) timing reference indication; and adjust a measurement of a target cell of a terrestrial network or a non-terrestrial network based on the GNSS timing reference indication.

In an example embodiment, the user node is configured to obtain the GNSS timing reference indication with an synchronization signal and PBCH block based radio resource management measurement timing configuration (SMTC) window and/or measurement gap indication.

In an example embodiment, the at least one memory and the computer code are further configured to, with the at least one processor, cause the user node to: obtain synchronization signal timing data associated with the cell by performing at least one synchronization signal measurement and noting the GNSS-based reception time.

According to a fifth aspect, a method comprises obtaining coverage information associated with a serving network and a target network; obtaining synchronization signal timing data associated with the target network; determining time drift rate data for a user node based at least partly on location data and satellite ephemeris data; and causing transmission of the time drift rate data associated with the time drift to the user node to enable the user node to perform a measurement of a target cell of the target network using the time drift rate data.

According to a sixth aspect, a method comprises obtaining time drift rate data associated with a time drift from a serving network, the time drift data having been determined based at least partly on location data and satellite ephemeris data; and applying the time drift data to perform a measurement of a target cell of a target network.

According to a seventh aspect, a method comprises obtaining coverage information associated with a serving network and a target network; obtaining synchronization signal timing data associated with the target network; and causing transmission of a user node global navigation satellite system (GNSS) timing reference indication to the user node to enable the user node to perform a measurement of a target cell of the target network based on the user node GNSS timing reference indication.

According to an eighth aspect, a method comprises obtaining a user node global navigation satellite system timing reference indication; and adjusting a (GNSS) measurement of a target cell of a terrestrial network or non-terrestrial network based on the GNSS timing a reference indication.

According to a ninth aspect, there is provided a computer program comprising instructions for causing an apparatus to perform at least the following: obtaining coverage information associated with a serving network and a target network; obtaining synchronization signal timing data associated with the target network; determining time drift rate data for at least one user node based at least partly on location data and satellite ephemeris; and causing transmission of the time drift rate data associated with the time drift to the user node to enable the user node to perform a measurement of a target cell of the target network using the time drift rate data.

According to a tenth aspect, there is provided a computer program comprising instructions for causing an apparatus to perform at least the following: obtaining time drift rate data associated with a time drift from a serving network, the time drift data having been determined based at least partly on location data and satellite ephemeris data; and applying the time drift data to perform a measurement of a target cell of a target network.

According to an eleventh aspect, there is provided a computer program comprising instructions for causing an apparatus to perform at least the following: obtaining coverage information associated with a serving network and a target network; obtaining synchronization signal timing data associated with the target network; and causing transmission of a user node global navigation satellite system (GNSS) timing reference indication to the user node to enable the user node to perform a measurement of a target cell of the target network based on the user node GNSS timing reference indication.

According to a twelfth aspect, there is provided a computer program comprising instructions for causing an apparatus to perform at least the following: obtaining a user node global navigation satellite system (GNSS) timing reference indication; and adjusting a measurement of a target cell of a terrestrial network or a non-terrestrial network based on the GNSS timing reference indication.

According to a thirteenth aspect, a network node may comprise means for: obtaining coverage information associated with a serving network and a target network; obtaining synchronization signal timing data associated with the target network; determining time drift rate data for a user node based at least partly on location data and satellite ephemeris data; and causing transmission of the time drift rate data associated with the time drift to the user node to enable the user node to perform a measurement of a target cell of the target network using the time drift rate data.

According to a fourteenth aspect, a user node may comprise means for: obtaining time drift rate data associated with a time drift from a source network, the time drift data having been determined based at least partly on location data and satellite ephemeris data; and applying the time drift data to perform a measurement of a target cell of a target network.

According to a fifteenth tenth aspect, a network node may comprise means for: obtaining coverage information associated with a serving network and a target network; obtaining synchronization signal timing data associated with the target network; and causing transmission of a user node global navigation satellite system (GNSS) timing reference indication to the user node to enable the user node to perform a measurement of a target cell of the target network based on the user node GNSS timing reference indication.

According to a sixteenth aspect, a user node may comprise means for: obtaining a user node global navigation satellite system (GNSS) timing reference indication; and adjusting a measurement of a target cell of a terrestrial network or a non-terrestrial network based on the GNSS timing reference indication.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms, in which the present example may be constructed or utilized. The description sets forth the functions of the example and the sequence of steps for constructing and operating the example. However, the same or equivalent functions and sequences may be accomplished by different examples.

Figure 1:
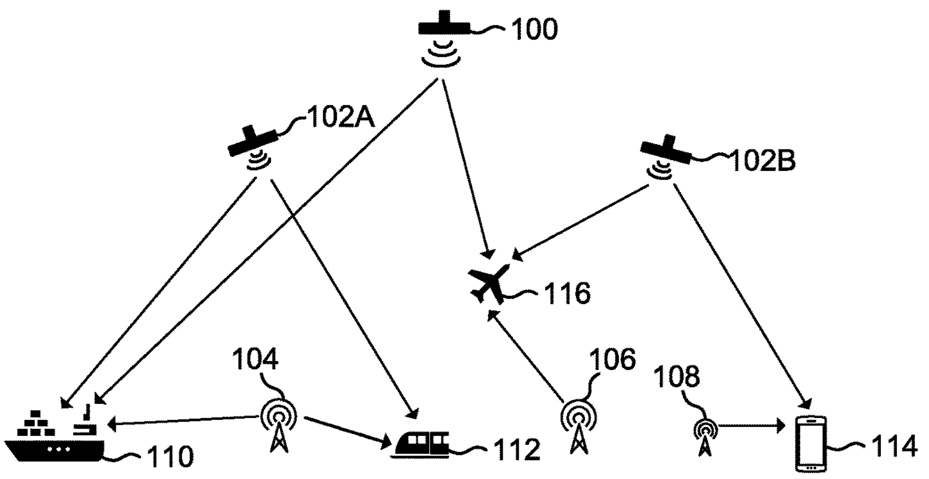
FIG. 1 illustrates a mobility situation between a terrestrial network (TN) and a non-terrestrial network (NTN).

FIG. 1 illustrates a mobility situation between a terrestrial network (TN) and a non-terrestrial network (NTN). FIG. 1 illustrates two low earth orbit (LEO) satellites 102A, 102B and one geostationary earth orbit (GEO) satellite 100. In the case of IN to NIN and vice versa, mobility will happen, for example, when user nodes (for example, smartphones, goods) move on board a ship/truck/train. A ship 110 may be considered to be a low speed vehicle operating at a remote area. It usually has limited (secondary) TN connectivity and good (primary) NTN (LEO or GEO) connectivity. A train 112 may be considered to be a medium/high speed vehicle. It usually has wide (secondary) NTN connectivity and good (primary) TN connectivity. An airplane 116 may be considered to be a very high speed vehicle. It usually has limited (primary) TN connectivity and wide (secondary) NTN (LEO or GEO) connectivity. A slowly moving person 114 may be considered to be a low speed case. It has wide (secondary) NTN connectivity and good (primary) TN connectivity.

In case of the NTN, the NTN user node will be time-frequency synchronized to a serving cell. In case of a low-earth orbit (LEO) scenario this means the user nodes understanding of time will change (relative to an earth-fixed time, for example, UTC) because LEO satellites move with about 7.5 km/s relative to Earth (at an altitude of 600-1200 km). If the network (or the user node) has determined that the user node needs to measure a target cell in a terrestrial network, a problem is that the UE timing relative to the TN target cell will drift and at the same time the TN target cell timing is fixed, i.e. it does not change in the geographical area of the cell. Thus, unless the SSB-based radio resource management (RRM) measurement timing configuration (SMTC) window and/or measurement gaps are frequently adjusted, at some point the Synchronization Signal and PBCH (Physical Broadcast Channel) blocks (SSB) of the TN target cell fall outside the window/gap.

Figure 2A:
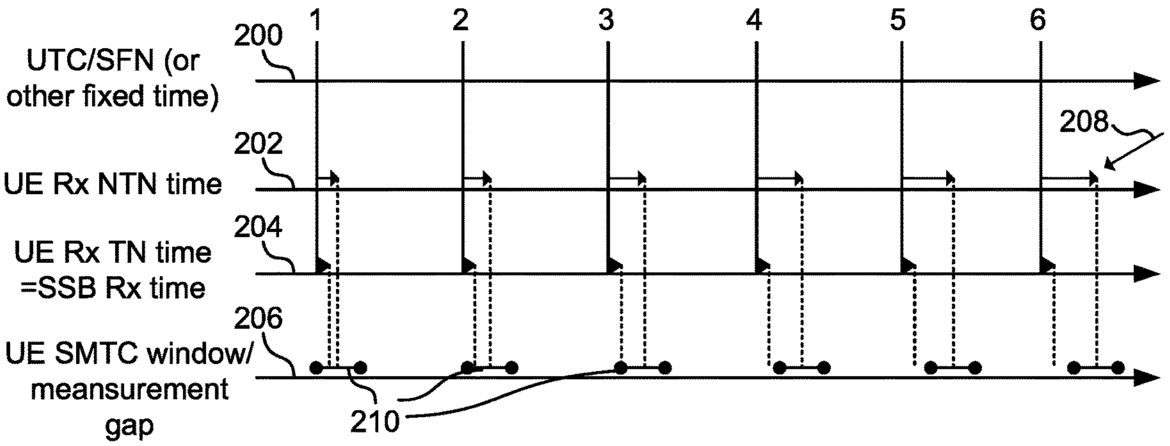
FIG. 2A illustrates a timing drift in a TN measurement.

FIG. 2A illustrates a timing drift in a IN measurement. FIG. 2A illustrates six time references 200. The time reference may refer, for example, to coordinated universal time (UTC) or a system frame number (SFN). The user node adjusts 208 its internal clock based on the NIN time 202. This means that the received NTN time 202 will drift from the user node's perspective. The drift is caused by satellite movement, leading to both service and feeder link propagation distance changes.

At the time references 1, 2 and 3, the user node's window/measurement gap 210 is still able to capture the SSB 204 of the TN. At some point, the user node's SMTC window/measurement gap is no longer able to capture the SSB of the TN gNB. As can be seen from FIG. 2A, at time references 4, 5 and 6 the TN SSB falls outside, which means the user node is unable to measure the TN cell. In this example, in most TN cells the propagation delay can be considered static, since the TN cell coverage is limited (<10 km in most cases).

Figure 2B:
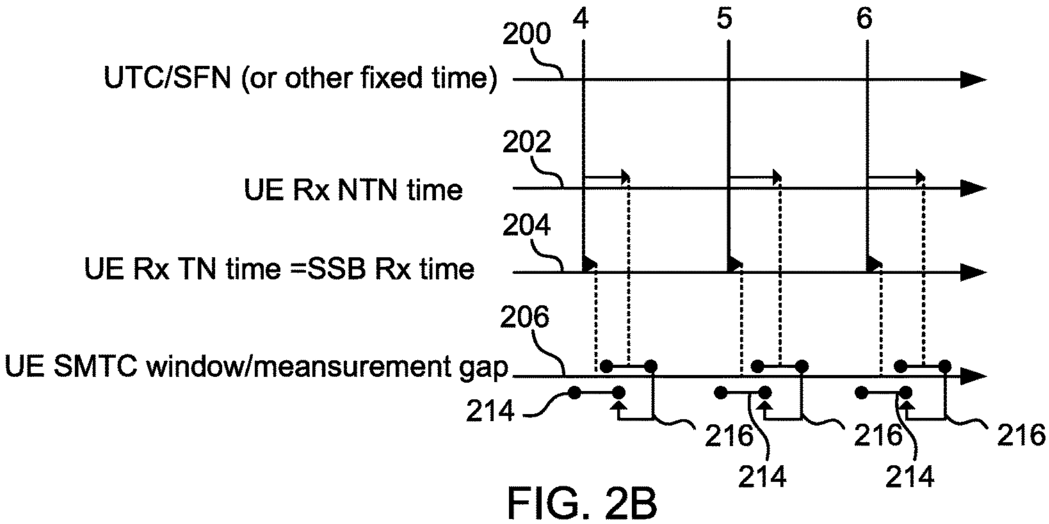
FIG. 2B illustrates an example embodiment of shifting the SMTC window and/or measurement gap based on time drift rate.

FIG. 2B illustrates an example embodiment of shifting the SMTC window and/or measurement gap based on time drift rate. Compared to FIG. 2A, at the time references 4, 5 and 6, the user node shifts 216 the SMTC window/measurement gap 214 to a new location so that the TN SSB 204 falls within the SMTC window/measurement gap. The data enabling the drift is received from a network node of the NIN network. The network node of the NTN network will define how the user node shall change the SMTC window and/or measurement gap over time to reliably measure the target TN cell.

Even though FIG. 2B illustrates an example in which the target cell is a TN cell, the solution applies also in an embodiment in which the target cell is an NTN cell and the serving cell is a TN cell.

Figure 3:
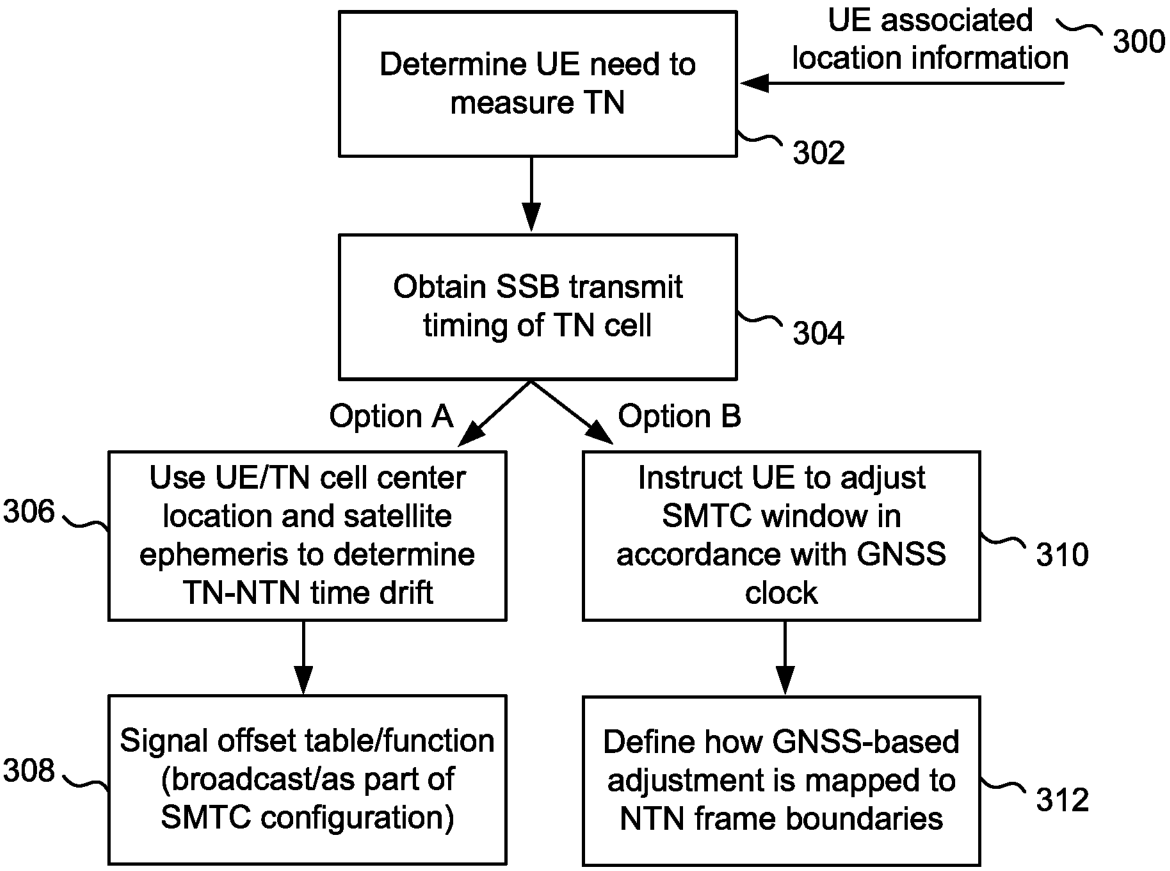
FIG. 3 illustrates a flow chart relating to an NTN cell decision process according to an example embodiment.

FIG. 3 illustrates a flow chart relating to an NTN cell decision process to according an example embodiment.

At 300 the NTN cell may be configured to obtain user node associated location information. The user node associated location information may comprise, for example, an earlier obtained user node location, knowledge about TN coverage or information about user nodes moving from a TN to the NTN in the past.

At 302 the NTN cell may be configured to determine a user node need to measure the TN.

At 304 the NTN cell may be configured to obtain SSB transmit timing of the TN cell. This information can be obtained based on network-side communication and/or user nodes handing over from the TN.

When proceeding with option A, at 306 the NTN cell may be configured to use user node location or TN cell center location and satellite ephemeris to determine a TN-NTN time drift. In an example embodiment, the determination may take into account also a feeder link delay.

At 308 the NTN cell may be configured to signal an offset table function to the user node. The signalled offset table or function instructs the user node to adjust the SMTC window and/or measurement gaps such that the SSBs of the TN target cell fall within the SMTC window and/or measurement gap while also ensuring the serving cell is aware how the user node adjusts the SMTC window and/or measurement gap. This is beneficial, for example, in situations when the user node may not be able to communicate with the serving cell during the SMTC window and/or measurement gap.

When proceeding with option B, at 310 the NTN cell may be configured to instruct the user node to adjust the SMTC window and/or measurement gap in accordance with a Global Navigation Satellite System (GNSS) clock.

At 312 the NTN cell may be configured to define how the GNSS-based adjustment is mapped to NTN frame boundaries.

Figure 4A:
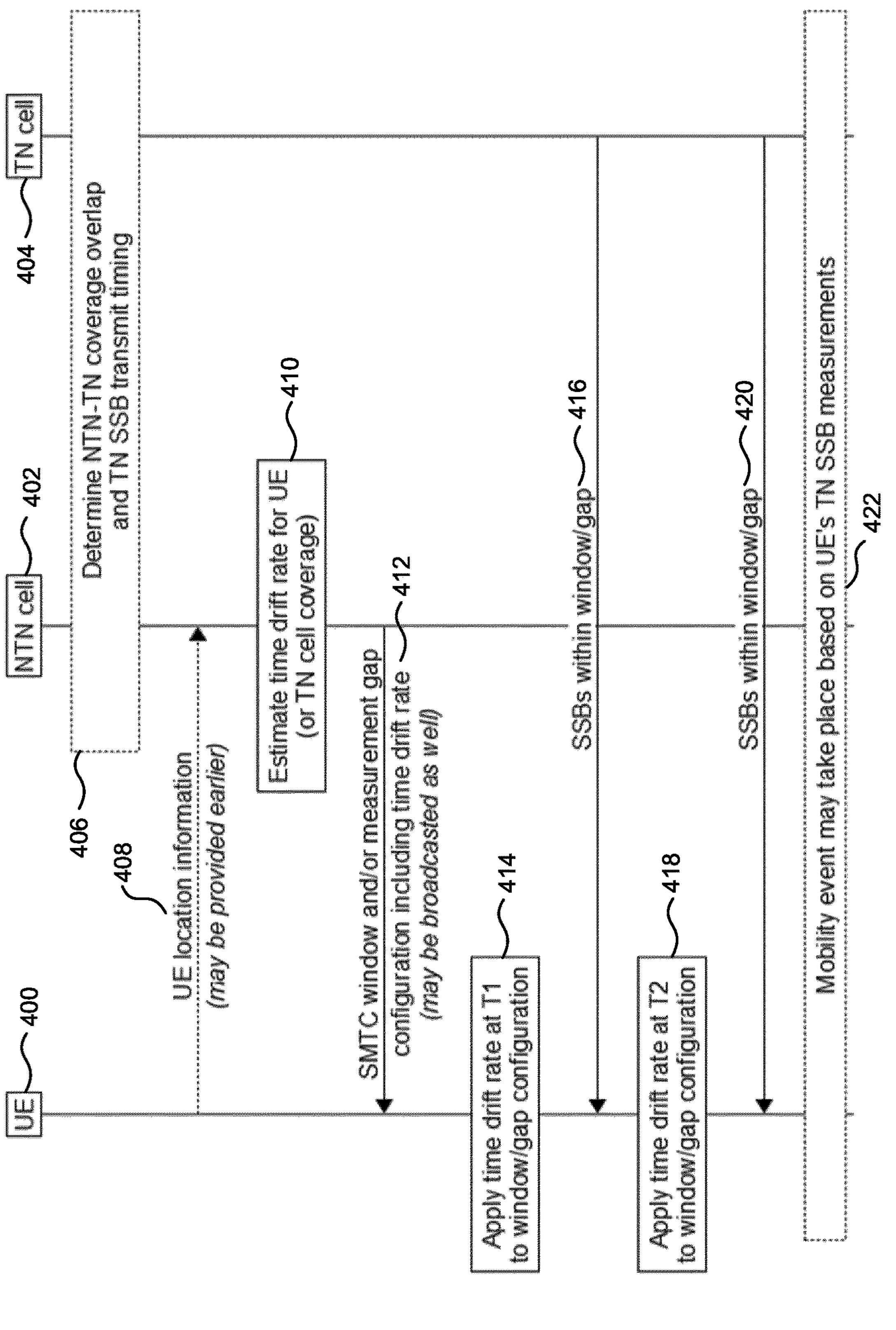
FIG. 4A illustrates a signaling diagram according to an example embodiment.

FIG. 4A illustrates a signaling diagram according to an example embodiment. In FIG. 4A, a user node 400 is served by an NIN cell 402 of a non-terrestrial network (NTN) while at the same time being in a coverage of a TN cell 404 of a terrestrial network. The NTN cell 402 may be provided, for example, by a low earth orbit (LEO) satellite.

At 406 a network node of the NTN, for example, a base station, may be configured to determine an NIN-TN coverage overlap and TN synchronization Signal and PBCH block (SSB) timing. This means that the NTN cell 402 is aware of the TN cell 404 coverage on earth and IN SSB transmit timing of the TN cell 404. In an example embodiment, this information can be obtained, for example, based on network-side communication and/or from user node handing over from the TN to the NIN. In another example embodiment, the information may include user node measurements shared with the network.

At 408 the NIN network node may be configured to obtain location information associated with the user node 400. In an example embodiment, this information may have been obtained already earlier.

At 410 the NTN network node may be configured to estimate how the time will drift for a specific location or area associated with the user node 400 to obtain a time drift rate data. The NTN network node may also be configured to determine and specific time references for each time drift value to obtain time reference data. In an example embodiment, the location can be based on a specific user node's location or on locations of a group of user nodes), a IN cell 404 center if the TN has provided such information to the NIN network node, the NTN cell 402 center or a historical knowledge of a geographical area where the user node's 400 handover between the TN and the NIN has occurred. In another example embodiment, the location can be based on location data associated with a radio coverage of a serving cell of the serving network or location data associated with a radio coverage of the target cell of the target network.

In an example embodiment, the time drift may be based on the location and the satellite ephemeris (for example, (orbital and/or position vector and time), and may also take into account a feeder link delay for transparent payload cases. The specific time references may indicate the time instances when the time drift values are to be applied by the user node 400. In an example embodiment, the specific time reference may comprises a system frame number (SFN) or coordinated universal time (UTC).

In an example embodiment, the NTN network node may also be configured to determine a validity time period for the estimated drift values. The validity time period can be set based, for example, on the target location/area with reference to the satellite (low, high elevation angle, distance, etc.) and/or the estimated rate of change in the time drift.

At 412 the NIN network node may be configured to provide SSB-based radio resource management (RRM) measurement timing configuration (SMTC) measurement configuration and/or measurement gap configuration to the user node 400. The NTN network node is configured to include with the data the time drift rate data for the user node 400 to be applied. In an example embodiment, the information sent from the NTN cell 402 to the user node 400 may be user node specific or broadcasted to a plurality of user node. The latter implementation may be used, for example, for relatively small TN cells, because the time drift will be similar for all user nodes within the TN cell 404 coverage area (as an example, this can be true in small cells within dense urban network deployment). Further, when applying the broadcasting, it enables NIN UEs to measure a TN cell as opposed to frequent UE-specific updates. This is contrary to the usage of multiple UE-specific SMTC windows, which would require UE-specific signalling to reconfigure whenever a significant time change has taken place.

Further, in case the information sent from the NTN cell 402 is broadcasted, it may also indicate which reference location point the estimate is made for. This may allow the user nodes at other IN cell locations to compensate for the propagation distance. When the user node 400 then applies the time drift rate from the specified reference time instance (for example, SEN or UTC), the network can be in-sync with the SMTC window and/or measurement gap settings used by the user node 400 without the need for explicit signaling from the user node 400.

At 414 the user node 400 may be configured to apply at a first time reference T1 the SMTC measurement configuration data received from the NTN cell 402 on the SMTC window and/or measurement gap to perform the TN cell 404 measurement by measuring the TN SSB indicated by a reference 416. At 418 the user node 400 may be configured to repeat the process and apply at a second time reference T2 the SMTC measurement configuration data received from the NIN cell 402 on the SMTC window and/or measurement gap to perform the TN cell 404 measurement by measuring the TN SSB indicated by a reference 420.

In an example embodiment, the user node 400 may be configured to inform a serving gNB of the TN cell 404 about potential deviations and/or errors experienced while trying to measure the TN cell 404, for example, a missed detection of the TN cell when using one of the configured drift values. In an example embodiment, the deviation may be experienced between the performed measurement (according to the time drift rate) and the actual time of the synchronization signal.

In an example embodiment, the time drift rate data may comprise time reference data, window/gap offset data and optionally also validity time data. The following table shows an example of the time drift rate data signalled to the user node 400 in addition to the normal SMTC window/measurement gap configuration.

| Time reference | T1 | T2 | T3 |
|---|---|---|---|
| Window/gap offset | 0 slots | −2 slots | −4 slots |
| Validity time | VT1 | VT2 | VT3 |

The table illustrated above provides an example of how the NTN cell 402 can signal window/gap offset values, which the user node 400 then applies at specific time references. The times T1, T2 and T3 can be, for example, be SFN 0, 5 and 10. Alternatively, the network can signal the time drift rate as a function, for example, offset=−2*delta time reference point.

Further, in an example embodiment, a validity time (VT) period can also be associated with and signalled for each drift value. These validity time periods can be set to span over two or more of the reference time instances, indicating to the user node 400 that more than one SMTC/MG configuration can be used. In the example in the above table: T2−T1<VT1, T3−T2=VT2 and VT3=max expected validity for configuration starting at T3.

At 422 a mobility event may take place based on the TN SSB measurement performed by the user node 400.

The illustrated solution may also provide a solution that is user node autonomous. In other words, the user node shifts window/gap according to a network definition but still under the full control of the network, including keeping in-sync with the user node applied time drift.

The illustrated solution may also facilitate power-efficient monitoring for RRC Idle/Inactive user nodes currently monitoring for paging from an NIN cell, but searching for TN cells.

Figure 4B:
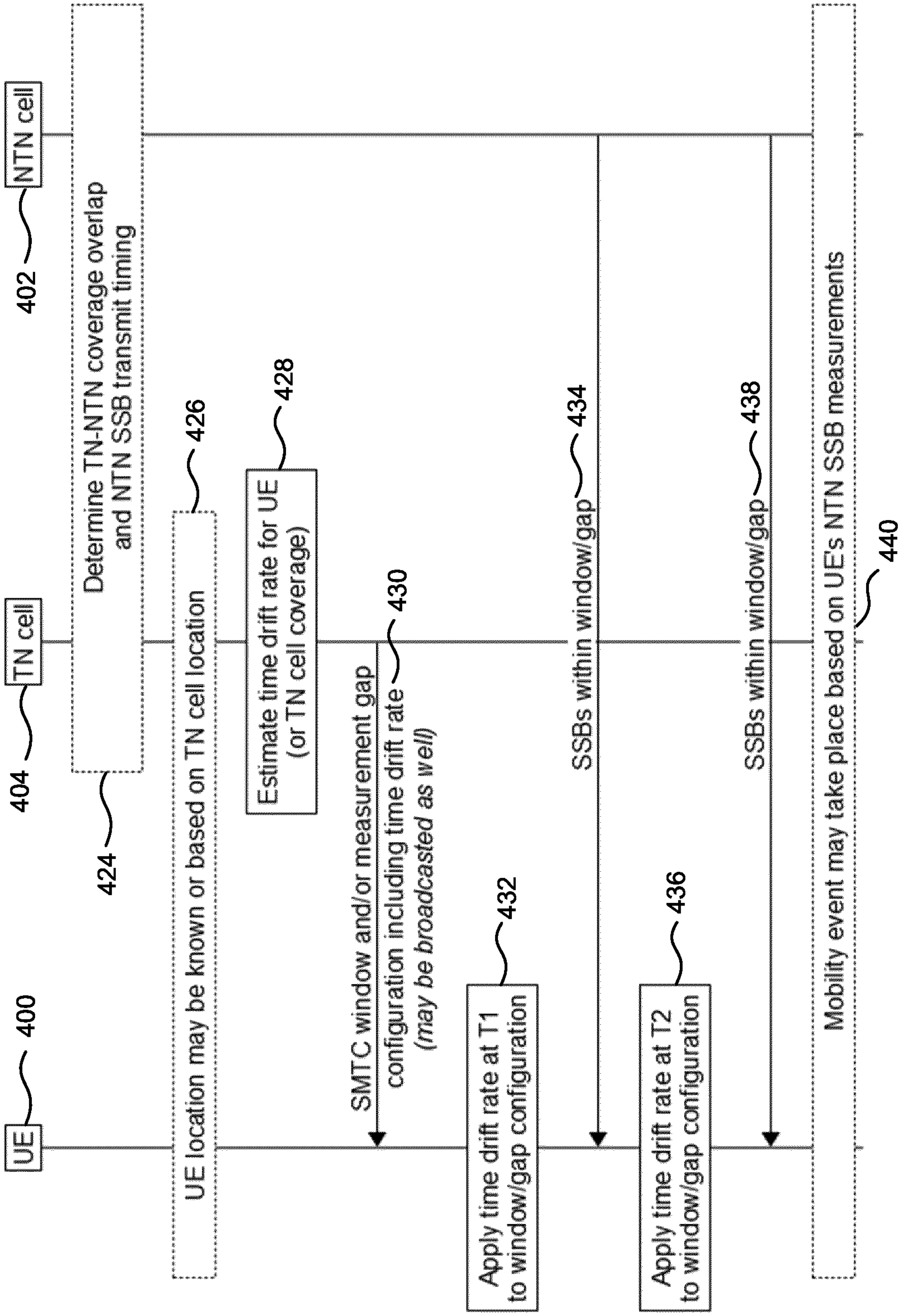
FIG. 4B illustrates a signaling diagram according to an example embodiment.

FIG. 4B illustrates a signaling diagram according to an example embodiment. In FIG. 4B, a user node 400 is served by the TN cell 404 while at the same time being in a coverage of the NTN cell 402. The NTN cell 402 may be provided, for example, by a low earth orbit (LEO) satellite.

At 424 a network node of the TN, for example, a base station, determines a TN-NTN coverage overlap and NTN synchronization Signal and PBCH block (SSB) timing. This means that the TN cell 404 is aware of the NTN cell 402 coverage on earth and NTN SSB transmit timing of the NTN cell 402. In an example embodiment, this information can be obtained, for example, based on network-side communication and/or from user node handing over from the NIN to the TN. In another example embodiment, the information may include user node measurements shared with the network.

At 426 the IN network node may be configured to obtain location information associated with the user node 400. The location may be already known or may be determined based on the TN cell 404 location. Thus, it may not be necessary to obtain the location, for example, by a separate measurement.

At 428 the TN network node may be configured to estimate how the time will drift for a specific location or area associated with the user node 400 to obtain a time drift rate data. The TN network node may also be configured to determine specific time references for each time drift value to obtain time reference data. In an example embodiment, the location can be based on a specific user node's location or on locations of a group of user nodes), an NIN cell center if the NTN has provided such information to the TN network node, the TN cell 404 center or a historical knowledge of a geographical area where the user node's 400 handover between the NIN and the TN has occurred. In another example embodiment, the location can be based on location data associated with a radio coverage of a serving cell of the serving network or location data associated with a radio coverage of the target cell of the target network.

In an example embodiment, the time drift may be based on the location and the satellite ephemeris (for example, (orbital and/or position vector and time), and may also take into account a feeder link delay transparent payload cases. The specific time references may indicate the time instances when the time drift values are to be applied by the user node 400. In an example embodiment, the specific time reference may comprises a system frame number (SFN) or coordinated universal time (UTC).

In an example embodiment, the TN network node may also be configured to determine a validity time period for the estimated drift values. The validity time period can be set based, for example, on the target location/area with reference to the satellite (low, high elevation angle, distance, etc.) and/or the estimated rate of change in the time drift.

At 430 the TN network node may be configured to provide SSB-based radio resource management (RRM) measurement timing configuration (SMTC) measurement configuration and/or measurement gap configuration to the user node 400. The NIN network node may be configured to include with the data the time drift rate data for the user node 400 to be applied. In an example embodiment, the information sent from the TN cell 404 to the user node 400 may be user node specific or broadcasted to a plurality of user node. In case the information sent from the IN cell 404 is broadcasted, it may also indicate which reference location point the estimate is made for. This may allow the user nodes at other IN cell locations to compensate for the propagation distance. When the user node 400 then applies the time drift rate from the specified reference time instance (for example, SFN or UTC), the network can be in-sync with the SMTC window and/or measurement gap settings used by the user node 400 without the need for explicit signaling from the user node 400.

At 432 the user node 400 may be configured to apply at a first time reference T1 the SMTC measurement configuration data received from the TN cell 404 on the SMTC window and/or measurement gap to perform the NTN cell 402 measurement by measuring the NTN SSB indicated by a reference 434. At 436 the user node 400 may be configured to repeat the process and apply at a second time reference T2 the SMTC measurement configuration data received from the TN cell 404 on the SMTC window and/or measurement gap to perform the NTN cell 402 measurement by measuring the NTN SSB indicated by a reference 438.

In an example embodiment, the user node 400 may be configured to inform the TN cell 404 about potential deviations and/or errors experienced while trying to measure the NTN cell 402, for example, a missed detection of the NTN cell when using one of the configured drift values.

In an example embodiment, the time drift rate data may comprise time reference data, window/gap offset data and optionally also validity time data. The following table shows an example of the time drift rate data signalled to the user node 400 in addition to the normal SMTC window/measurement gap configuration.

| Time reference | T1 | T2 | T3 |
|---|---|---|---|
| Window/gap offset | 0 slots | −2 slots | −4 slots |
| Validity time | VT1 | VT2 | VT3 |

The table illustrated above provides an example of how the TN cell 404 can signal window/gap offset values, which the user node 400 then applies at specific time references. The times T1, T2 and T3 can be, for example, be SFN 0, 5 and 10. Alternatively, the network can signal the time drift rate as a function, for example, offset=−2*delta time reference point.

Further, in an example embodiment, a validity time (VT) period can also be associated with and signalled for each drift value. These validity time periods can be set to span over two or more of the reference time instances, indicating to the user node 400 that more than one SMTC/MG configuration can be used. In the example in the above table: T2−T1<VT1, T3−T2=VT2 and VT3=max expected validity for configuration starting at T3.

At 440 a mobility event may take place based on the NTN SSB measurement performed by the user node 400.

Figure 4C:
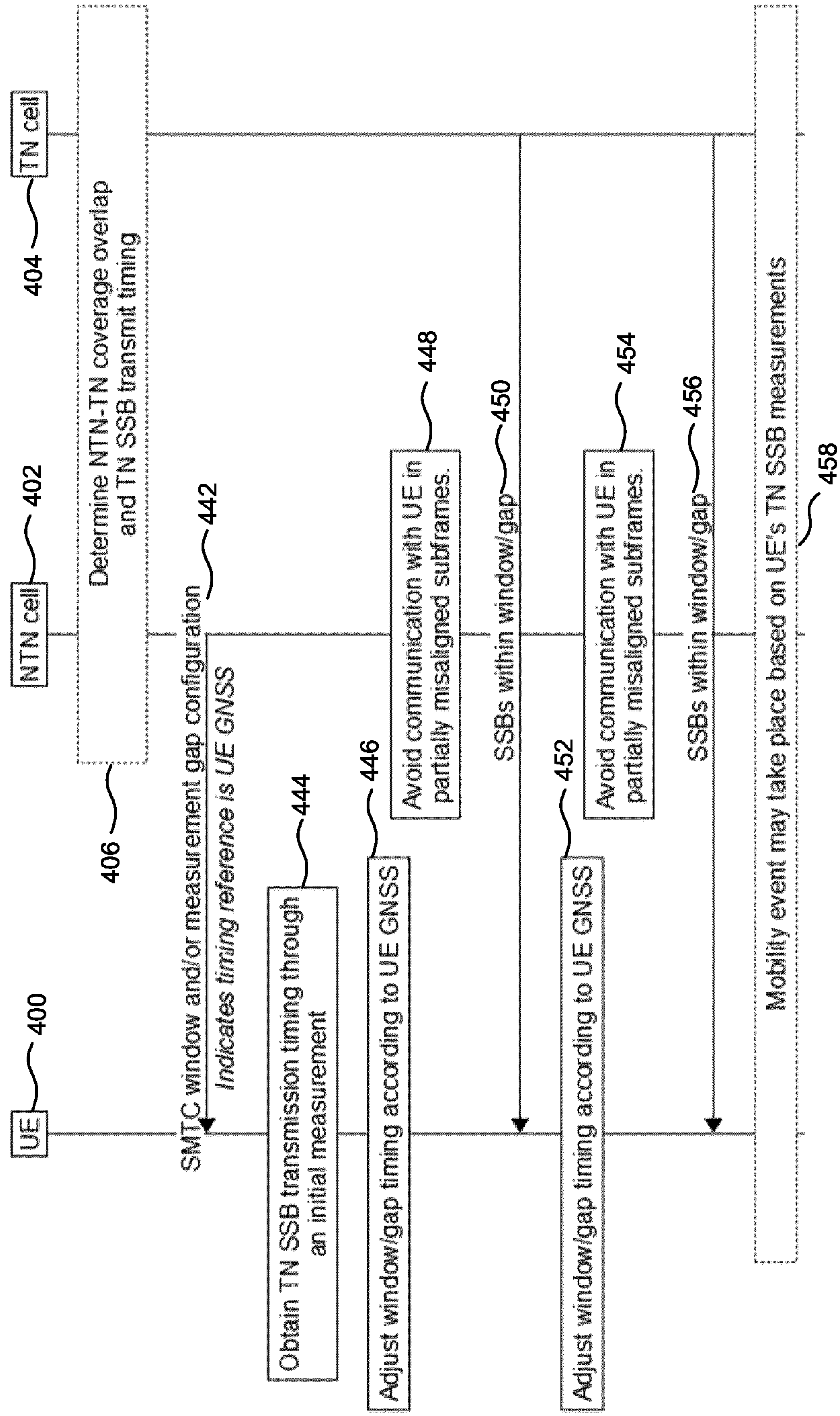
FIG. 4C illustrates a signaling diagram according to an example embodiment.

FIG. 4C illustrates a signaling diagram according to an example embodiment. In FIG. 4C, a user node 400 is served by an NTN cell 402 of a non-terrestrial network (NTN) while at the same time being in a coverage of a TN cell 404 of a terrestrial network. The NTN cell 402 may be provided, for example, by a low earth orbit (LEO) satellite.

At 406 a network node of the NTN, for example, a base station, determines an NIN-TN coverage overlap and TN synchronization Signal and PBCH block (SSB) timing. This means that the NTN cell 402 is aware of the TN cell 404 coverage on earth and TN SSB transmit timing of the TN cell 404. In an example embodiment, this information can be obtained, for example, based on network-side communication and/or from user node handing over from the TN to the NTN. In another example embodiment, the information may include user node measurements shared with the network.

At 442 the NIN network node may be configured to provide an SMTC measurement configuration and/or measurement gap configuration to the user node 400. The SMTC measurement configuration and/or measurement gap configuration indicates to the user node 400 that the timing reference is the user node's GNSS instead of the 3GPP network's timing.

At 444, the user node 400 may be configured to obtain IN SSB transmission timing through an initial measurement and noting the GNSS-based time of reception. Alternatively, in an example embodiment, the NIN cell 402 can obtain network-side information on the timing of the TN SSB transmissions, for example, via Xn, and share this information with the user node 400. Thus, the step 444 may be optional.

At 446 the user node 400 may be configured to adjust the SMTC measurement configuration and/or measurement gap configuration timing according to the obtained GNSS timing reference to perform the TN cell 404 measurement by measuring the TN SSB indicated by a reference 450. In another example embodiment, instead of using the GNSS to adjust the SMTC window and/or measurement gap configuration timing, the user node 400 may be configured to adjust the SMTC window and/or measurement gap configuration timing based on UTC information. The UTC information may be obtained, for example, the NR SIB9, which carries a UTC time stamp. If using the UTC information, the user node 400 may be configured to agree the use of the UTC information with the NIN cell 402 such that the NIN cell 402 is aware of the adjustments when scheduling.

At 448 the NTN cell 402 may be configured to avoid communication with the user node 400 in partially misaligned subframes. The SMTC window and/or measurement gap used for the TN SSB reception may not be completely aligned with the frame boundaries of the NIN frame. As the NTN cell 402 is aware of the fixed TN time, the NIN cell 402 is able to avoid communication with the user node 400 in those partially overlapped subframes.

At 452 the user node 400 may be configured to repeat the process and adjust the SMTC measurement configuration and/or measurement gap configuration timing according to the obtained GNSS timing reference to perform the TN cell 404 measurement by measuring the TN SSB indicated by a reference 456.

At 454 the NTN cell 402 may again be configured to avoid communication with the user node 400 in partially misaligned subframes.

At 458 a mobility event may take place based on the TN SSB measurement performed by the user node 400.

Figure 4D:
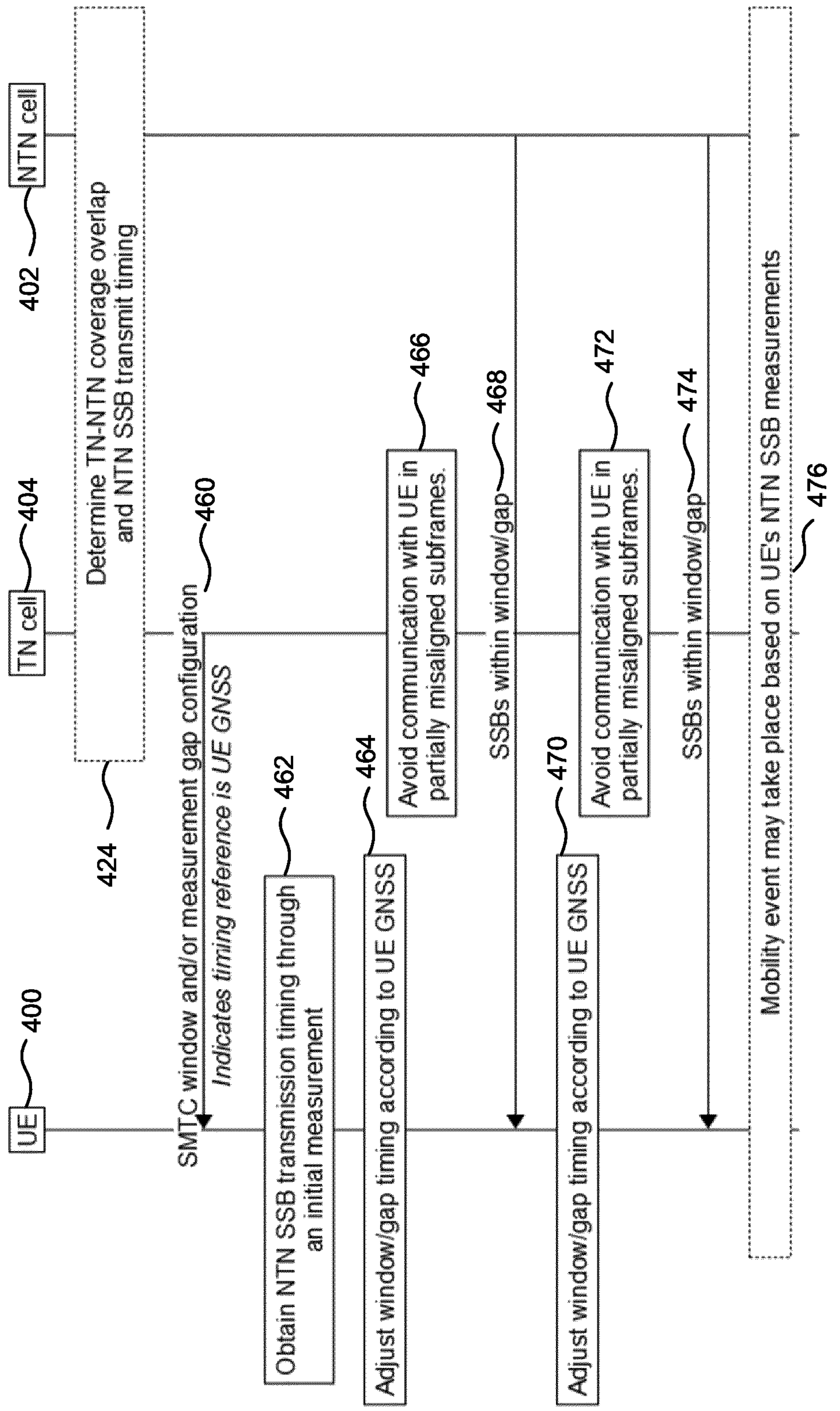
FIG. 4D illustrates a signaling diagram according to an example embodiment.

FIG. 4D illustrates a signaling diagram according to an example embodiment. In FIG. 4D, a user node 400 is served by a TN cell 404 of a terrestrial network (TN) while at the same time being in a coverage of an NIN cell 404 of a non-terrestrial network. The NTN cell 402 may be provided, for example, by a low earth orbit (LEO) satellite.

At 424 a network node of the TN, for example, a base station, determines a TN-NTN coverage overlap. This means that the TN cell 404 is aware of the NTN cell 402 coverage on earth. In an example embodiment, the network node may also determine NTN synchronization Signal and PBCH block (SSB) timing information, and thus be aware of the NTN SSB transmit timing of the NTN cell 402. In an example embodiment, this information can be obtained, for example, based on network-side communication and/or from user node handing over from the NIN to the TN. In another example embodiment, the information may include user node measurements shared with the network.

At 460 the TN network node may be configured to provide an SMTC measurement configuration and/or measurement gap configuration to the user node 400. The SMTC measurement configuration and/or measurement gap configuration indicates to the user node 400 that the timing reference is the user node's GNSS instead of the 3GPP network's timing. In an example embodiment, the TN network node may additionally provide the previously obtained NIN SSB transmission time information to the user node 400.

At 462, the user node 400 may be configured to obtain NTN SSB transmission timing through an initial measurement and thus noting the GNSS-based time of reception. Alternatively, in an example embodiment, the TN cell 404 may obtain network-side information on the timing of the NTN SSB transmissions, for example, via Xn, and share this information with the user node 400. Thus, the step 462 may be optional.

At 464 the user node 400 may be configured to adjust the SMTC measurement configuration and/or measurement gap configuration timing according to the obtained GNSS timing reference to perform the NTN cell 402 measurement by measuring the TN SSB indicated by a reference 468. In another example embodiment, instead of using the GNSS to adjust the SMTC window and/or measurement gap configuration timing, the user node 400 may be configured to adjust the SMTC window and/or measurement gap configuration timing based on UTC information. The UTC information may be obtained, for example, via the NR SIB9, which carries a UTC time stamp. If using the UTC information, the user node 400 may be configured to agree the use of the UTC information with the IN cell 404 such that the TN cell 404 is aware of the adjustments when scheduling.

At 466 the TN cell 404 may be configured to avoid communication with the user node 400 in partially misaligned subframes. The SMTC window and/or measurement gap used for the NTN SSB reception may not be completely aligned with the frame boundaries of the TN frame. As the TN cell 404 is aware of the fixed NTN time, the TN cell 404 is able to avoid communication with the user node 400 in those partially overlapped subframes.

At 470 the user node 400 may be configured to repeat the process and adjust the SMTC measurement configuration and/or measurement gap configuration timing according to the obtained GNSS timing reference to perform the BTN cell 402 measurement by measuring the NTN SSB indicated by a reference 474.

At 472 the TN cell 404 may again be configured to avoid communication with the user node 400 in partially misaligned subframes.

At 476 a mobility event may take place based on the NTN SSB measurement performed by the user node 400.

Figure 5:
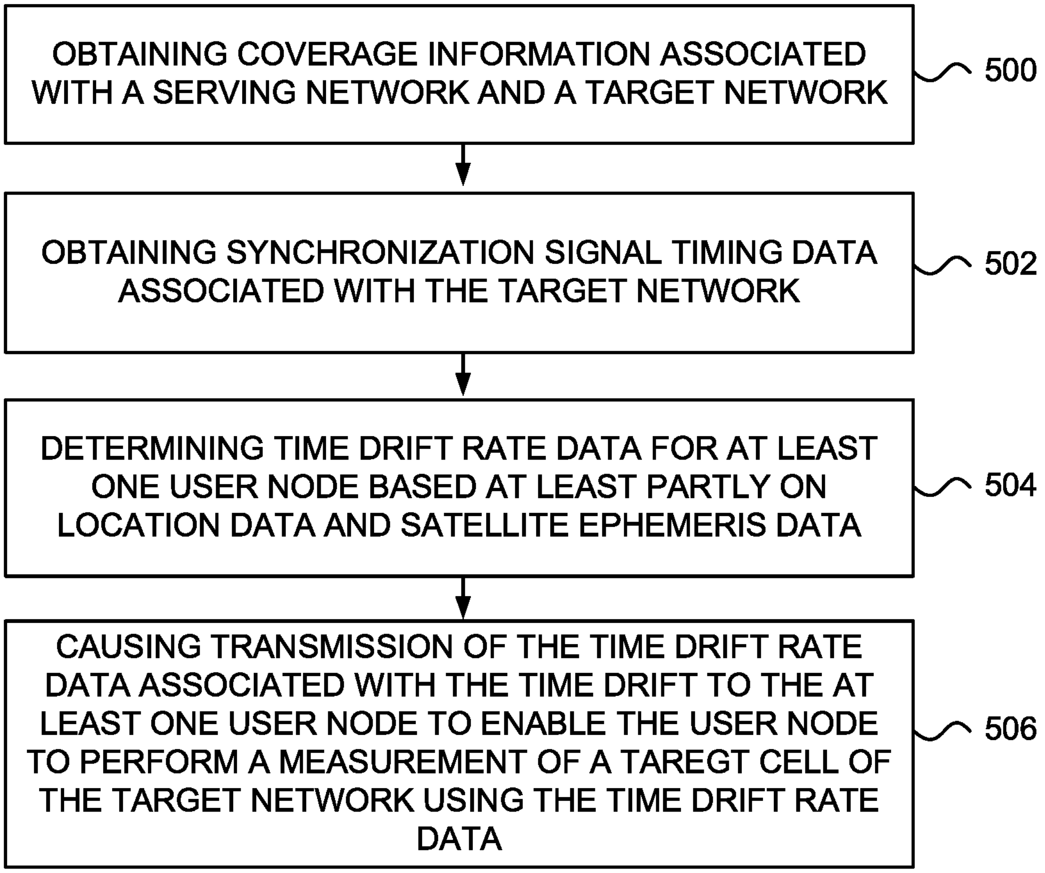
FIG. 5 illustrates an example of a method according to an example embodiment.

FIG. 5 illustrates an example of a method according to an example embodiment. The method may be performed by a network node of a serving network, for example, when a user node is served by a cell of a serving network, for example, a non-terrestrial network (NTN) or a terrestrial network (TN).

At 500 coverage information associated with a serving network and a target network is obtained.

At 502 synchronization signal timing data associated with the target network is obtained.

At 504 time drift rate data for a user node is determined based at least partly on location data and satellite ephemeris data.

Figure 6:
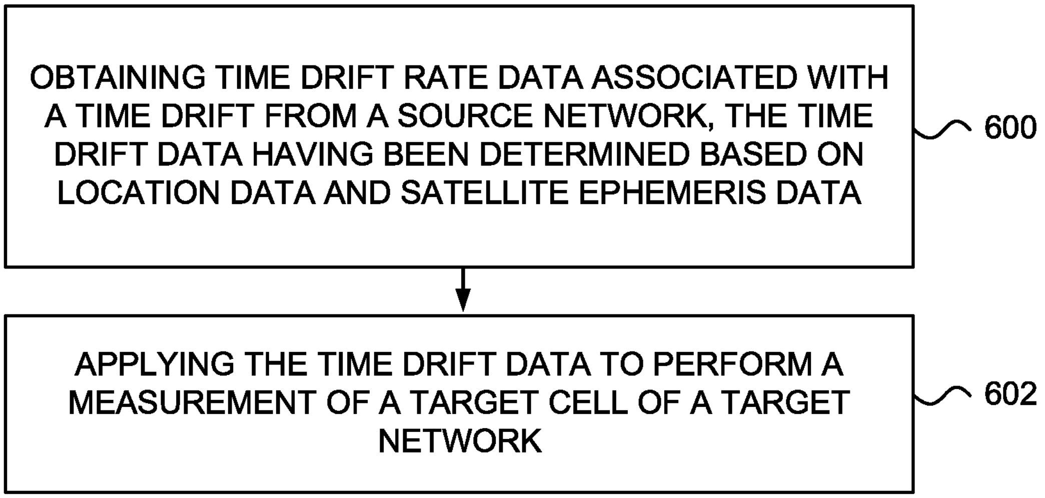
FIG. 6 illustrates an example of a method according to an example embodiment.

At 506 transmission of the time drift rate data associated with the time drift is caused to the user node to enable the user node to perform a measurement of a target cell of the target network using the time drift rate data FIG. 6 illustrates an example of a method according to an example embodiment. The method may be performed, for example, by a user node served by a cell of a serving network, for example, a non-terrestrial network (NTN) or a terrestrial network (TN).

At 600 time drift rate data associated with a time drift is obtained from a serving network, the time drift data having been determined based at least partly on location data and satellite ephemeris data.

At 602 the time drift data is applied to perform a measurement of a target cell of at target network.

Figure 7:
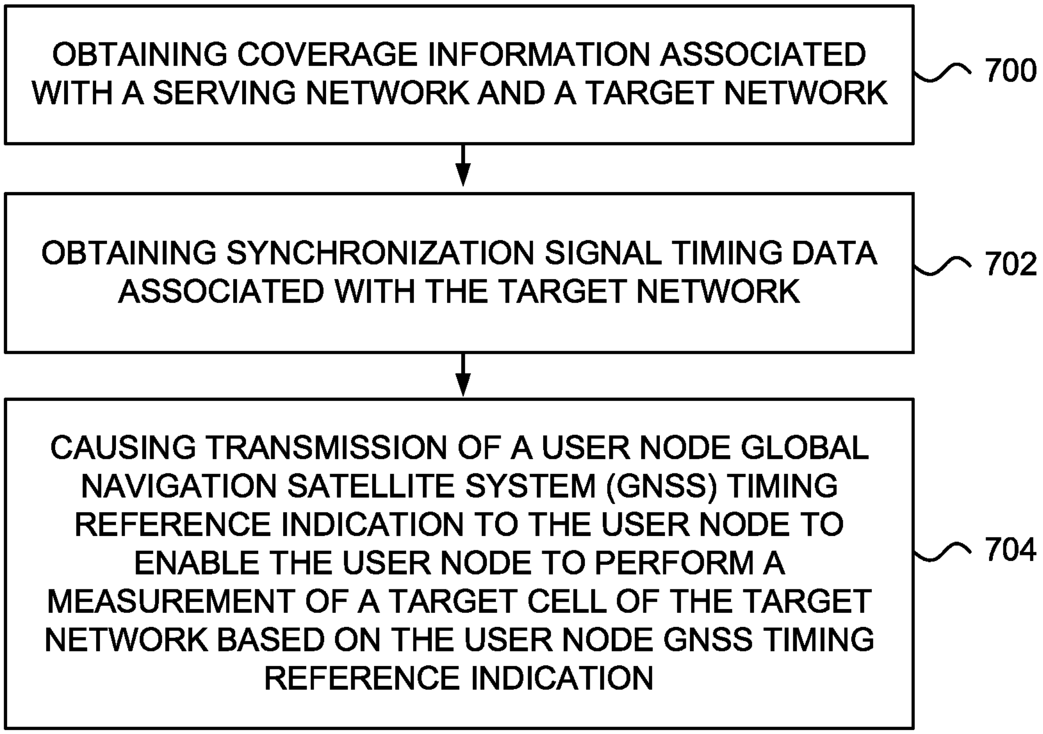
FIG. 7 illustrates an example of a method according to an example embodiment.

FIG. 7 illustrates an example of a method according to an example embodiment. The method may be applied, for example, when a user node is served by a cell of a serving network, for example, a non-terrestrial network (NTN) or a terrestrial network (TN).

At 700 coverage information associated with a serving network and a target network is obtained.

At 702 synchronization signal timing data associated with the target network is obtained.

At 704 transmission of a user node global navigation satellite system (GNSS) timing reference indication is caused to the user node to enable the user node to perform a measurement of a target cell of the target network based on the user node GNSS timing reference indication.

Figure 8:
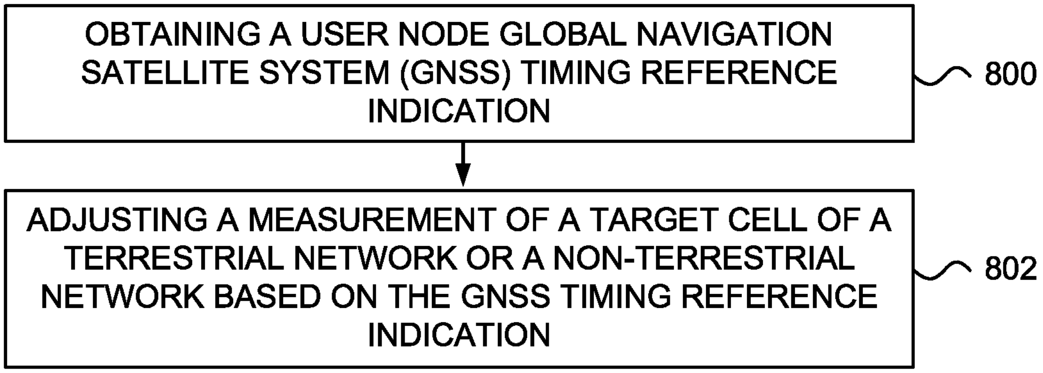
FIG. 8 illustrates an example of a method according to an example embodiment.

FIG. 8 illustrates an example of a method according to an example embodiment. The method may be applied, for example, by a user node served by a cell of a serving network, for example, a non-terrestrial network (NTN) or a terrestrial network (TN).

At 800 a user node global navigation satellite system (GNSS) timing reference indication is obtained.

At 802 a measurement of a target cell of a terrestrial network or a non-terrestrial network is adjusted based on the GNSS timing reference indication.

Figure 9:
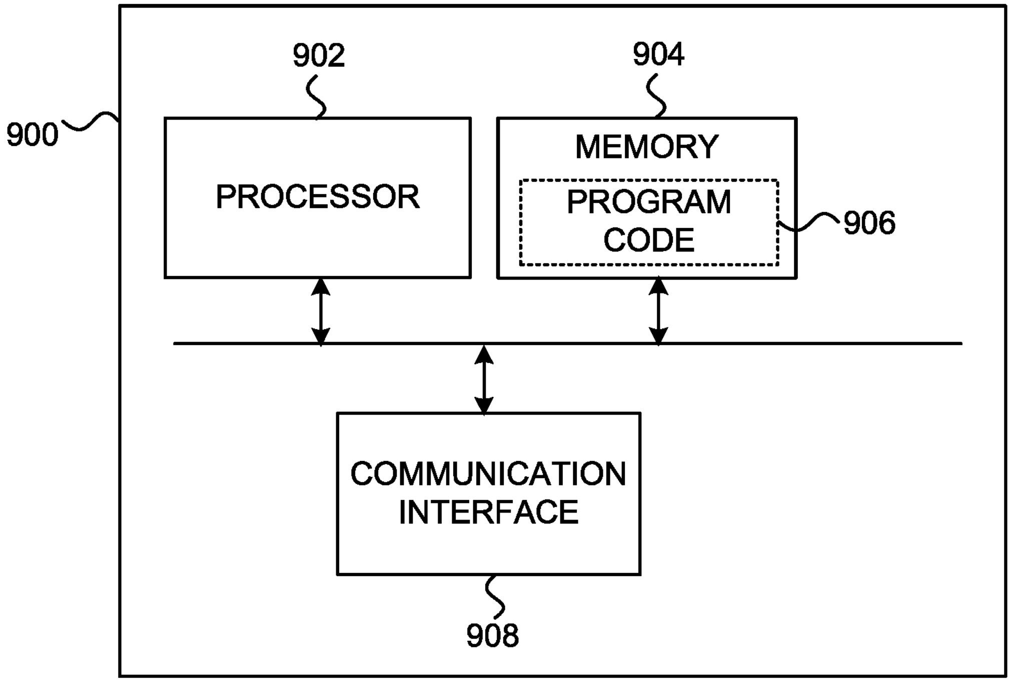
FIG. 9 illustrates an example of an apparatus configured to practice one or more example embodiments.

FIG. 9 illustrates an example of an apparatus 900 configured to practice one or more example embodiments. The apparatus 900 may comprise at least one processor 902. The at least one processor 902 may comprise, for example, one or more of various processing devices or processor circuitry, such as, for example, a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 900 may further comprise at least one memory 904. The at least one memory 904 may be configured to store, for example, computer program code or the like, for example, operating system software and application software. The at least one memory 904 may comprise one or more volatile memory devices, one or more non-volatile memory devices, and/or a combination thereof. For example, the at least one memory 904 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 900 may further comprise a communication interface 908 configured to enable apparatus 900 to transmit and/or receive information to/from other devices. In one example, the apparatus 900 may use the communication interface 908 to transmit or receive signaling information and data in accordance with at least one data communication or cellular communication protocol. The communication interface 908 may be configured to provide at least one wireless radio connection, such as, for example, a 3GPP mobile broadband connection (e.g. 3G, 4G, 5G, 6G etc.). In another example embodiment, the communication interface 908 may be configured to provide one or more other type of connections, for example a wireless local area network (WLAN) connection such as for example standardized by IEEE 802.11 series or Wi-Fi a short range wireless network connection such as for example a Bluetooth, NFC (near-field communication), or RFID connection; a wired connection, for example, a local area network (LAN) connection, a universal serial bus (USB) connection or an optical network connection, or the like; or a wired Internet connection. The communication interface 908 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

When the apparatus 900 is configured to implement some functionality, some component and/or components of the apparatus 900, for example, the at least one processor 902 and/or the at least one memory 904, may be configured to implement this functionality. Furthermore, when the at least one processor 902 is configured to implement some functionality, this functionality may be implemented using the program code 906 comprised, for example, in the at least one memory 904.

The functionality described herein may be performed, at least in part, by one or more computer program product components such as software components. According to an embodiment, the apparatus may comprise a processor or processor circuitry, for example, a microcontroller, configured by the program code when executed to execute the embodiments of the operations and functionality described. Alternatively, or in addition, functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), and Graphics Processing Units (GPUs).

The apparatus 900 may comprise means for performing at least one method described herein. In an example embodiment, the means may comprise the at least one processor 902, the at least one memory 904 including program code 906 configured to, when executed by the at least one processor, cause the apparatus 900 to perform the method.

The apparatus 900 may comprise, for example, a computing device, for example, a base station, a server, a mobile device, a mobile phone, a user node, a network node, a user equipment, a user node, a tablet computer, a laptop, an internet of things (IoT) device, or the like. Examples of IoT devices include, but are not limited to, consumer electronics, wearables, sensors, and smart home appliances. In one example, the apparatus 900 may comprise a vehicle such as, for example, a car. Although the apparatus 900 is illustrated as a single device it is appreciated that, wherever applicable, functions of the apparatus 900 may be distributed to a plurality of devices, for example, to implement example embodiments as a cloud computing service.

An apparatus, for example, a node such as a user equipment, a user node, a mobile device, an IoT node, a network node or a cloud node may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been above described a certain degree of with particularity, or with reference to one or more individual embodiments, those skilled in the art could make numerous alterations to the disclosed embodiments without departing from scope of this specification.

The invention claimed is:

1. A network node, comprising:

at least one processor; and at least one memory including computer program code, the at least one memory and the computer code configured to, with the at least one processor, cause the network node at least to:

obtain coverage information associated with a serving network and a target network, wherein the serving network comprises a non-terrestrial network (NTN) cell serving at least one user node and the target network comprises a terrestrial network (TN) including a target TN cell;

obtain synchronization signal timing data associated with the target network, wherein the synchronization signal timing data comprises TN synchronization signal and PBCH block (SSB) transmit timing of the target TN cell;

determine time drift rate data for at least one user node based at least partly on location data and satellite ephemeris data, wherein the time drift rate data is for adjustment of a synchronization signal and PBCH block based radio resource management measurement timing configuration (SMTC) window and/or a measurement gap used by the at least one user node to measure TN SSBs of the target TN cell; and cause transmission of the time drift rate data associated with the time drift to the at least one user node as part of an SMTC window and/or measurement gap configuration to enable the user node to perform an SSB measurement of the target TN cell using the time drift rate data.

2. The network node according to claim 1, wherein the location data comprises all of the following: location data of the user node, location data associated with a group of user nodes, location data associated with a serving cell center of the serving network, location data associated with a target cell center of the target network, location data associated with a radio coverage of a serving cell of the serving network, location data associated with a radio coverage of the target cell of the target network, and historical location data associated with a handover of the user node between the serving network and the target network.

3. The network node according to claim 1, wherein the time drift rate data comprises time reference data and window/gap offset data to perform the SSB measurement of the target TN cell, the window/gap offset data comprising a specific window/gap offset value for each time reference value in the time reference data.

4. The network node according to claim 3, wherein the time drift rate data further comprises validity time period data, the validity time period data comprising a specific validity time for each window/gap offset value in the window/gap offset data, and wherein the validity time period data is set based on at least one of a target location or area relative to a satellite or an estimated rate of change in the time drift.

5. The network node according to claim 1, wherein the time drift rate data is transmitted as a broadcast transmission to a plurality of user nodes for a TN cell for which the time drift is similar for user nodes within coverage of the TN cell, and wherein the broadcast transmission indicates a reference location point for which the time drift rate data is determined to allow user nodes at other TN cell locations to compensate for propagation distance.

6. The network node according to claim 1, wherein the serving network comprises a non-terrestrial network, and the target network comprises the terrestrial network.

7. The network node according to claim 1, wherein the network node is configured to cause transmission of the time drift rate data with a synchronization signal and PBCH block based radio resource management measurement timing configuration (SMTC) window and/or measurement gap indication, and wherein the time drift rate data is applicable by the user node from a specified system frame number (SFN) or coordinated universal time (UTC) reference time instance such that the network node remains in sync with SMTC window and/or measurement gap settings used by the user node without explicit signaling from the user node.

8. A user node, comprising:

at least one processor; and at least one memory including computer program code, the at least one memory and the computer code configured to, with the at least one processor, cause the user node at least to:

while served by a non-terrestrial network (NTN) cell and while in coverage of a terrestrial network (TN) cell, obtain a synchronization signal and PBCH block based radio resource management measurement timing configuration (SMTC) window and/or measurement gap configuration including time drift rate data associated with a time drift from a serving network, the time drift rate data having been determined based at least partly on location data and satellite ephemeris data; and apply the time drift rate data to adjust an SMTC window and/or measurement gap to perform an SSB measurement of a target TN cell of a target network.

9. The user node according to claim 8, wherein the time drift rate data comprises time reference data and window/gap offset data to perform the SSB measurement of the target TN cell, the window/gap offset data comprising a specific window/gap offset value for each time reference value in the time reference data.

10. The user node according to claim 9, wherein the time drift rate data further comprises validity time period data, the validity time period data comprising a specific validity time for each window/gap offset value in the window/gap offset data.

11. The user node according to claim 8, wherein the time drift data further comprises an indication of a reference location point based on which the time drift rate data has been determined, and wherein the user node compensates for propagation distance based on the reference location point.

12. The user node according to claim 8, wherein the at least one memory and the computer code are further configured to, with the at least one processor, cause the user node to:

cause transmission of an indication about a deviation or error experienced while trying to perform the SSB measurement of the target TN cell, the deviation or error comprising at least one of a missed detection of the target TN cell when using one of the configured drift values or a deviation between the performed measurement and an actual time of a synchronization signal.

13. The user node according to claim 8, wherein the user node is configured to obtain the time drift rate data with an SMTC window and/or measurement gap configuration, apply the time drift rate data at a first time reference T1 to the SMTC window and/or measurement gap configuration to measure a first TN SSB within the SMTC window and/or measurement gap, and apply the time drift rate data at a second time reference T2 to the SMTC window and/or measurement gap configuration to measure a second TN SSB within the SMTC window and/or measurement gap.

14. The user node according to claim 8, wherein the location data comprises all of the following: location data of the user node, location data associated with a group of user nodes, location data associated with a serving cell center of the serving network, location data associated with a target cell center of the target network, location data associated with a radio coverage of a serving cell of the serving network, location data associated with a radio coverage of the target cell of the target network, and historical location data associated with a handover of the user node between the serving network and the target network.

15. The user node according to claim 8, wherein the user node is in an RRC Idle state or an RRC Inactive state, monitors for paging from the NTN cell, and searches for the target TN cell using the adjusted SMTC window and/or measurement gap.

16. The user node according to claim 8, wherein the user node shifts the SMTC window and/or measurement gap according to a network definition while the serving network remains in sync with SMTC window and/or measurement gap settings used by the user node without explicit signaling from the user node.

17. The user node according to claim 8, wherein the time drift rate data comprises a signaled function defining a window/gap offset as −2 multiplied by a delta time reference point.

18. A method performed by a user node, comprising: while served by a non-terrestrial network (NTN) cell and while in coverage of a target terrestrial network (TN) cell, obtaining, from a serving network, a synchronization signal and PBCH block based radio resource management measurement timing configuration (SMTC) window and/or measurement gap configuration including time drift rate data associated with a time drift between timing of the user node relative to the serving network and timing of TN synchronization signal and PBCH blocks (SSBs) of the target TN cell, the time drift rate data having been determined based at least partly on location data and satellite ephemeris data; and applying the time drift rate data to adjust an SMTC window and/or measurement gap to perform an SSB measurement of the target TN cell.

19. The method of claim 18, wherein the time drift rate data comprises time reference data, window/gap offset data, and validity time data, and wherein the window/gap offset data comprises offsets of 0 slots, −2 slots, and −4 slots for respective time references T1, T2, and T3.

20. The method of claim 18, wherein the SMTC window and/or measurement gap configuration is based on an NTN-TN coverage overlap and TN SSB transmit timing, wherein the time drift rate data is based on location information associated with the user node and is estimated for the user node or for TN cell coverage, wherein the user node obtains the SMTC window and/or measurement gap configuration including the time drift rate data, wherein the user node applies the time drift rate data at a first time reference T1 to perform a first TN SSB measurement within the SMTC window and/or measurement gap, wherein the user node applies the time drift rate data at a second time reference T2 to perform a second TN SSB measurement within the SMTC window and/or measurement gap, and wherein a mobility event takes place based on TN SSB measurements performed by the user node.

* * * * *